(12) United States Patent
Spatschek et al.

(10) Patent No.: US 8,317,399 B2
(45) Date of Patent: Nov. 27, 2012

(54) LINEAR MOTION DEVICE COMPRISING ROTATABLY ADJUSTABLE FLANGE

(75) Inventors: Gerd Spatschek, Mellrichstadt-Bahra (DE); Thomas Vogt, Werneck-Zeuzleben (DE); Josef Dirschbacher, Knetzgau-Hainert (DE)

(73) Assignee: Robert Bosch GmbH, Stuttgart (DE)

( * ) Notice: Subject to any disclaimer, the term of this patent is extended or adjusted under 35 U.S.C. 154(b) by 385 days.

(21) Appl. No.: 12/774,416

(22) Filed: May 5, 2010

(65) Prior Publication Data
US 2010/0290725 A1    Nov. 18, 2010

(30) Foreign Application Priority Data

May 13, 2009   (DE) .......................... 10 2009 021 017

(51) Int. Cl.
*F16C 29/06*   (2006.01)
(52) U.S. Cl. .......................................... 384/57; 384/59
(58) Field of Classification Search .................... 384/43, 384/45, 49, 57, 59; 74/89.32, 89.34, 492, 74/493
See application file for complete search history.

(56) References Cited

U.S. PATENT DOCUMENTS

| | | | |
|---|---|---|---|
| 6,190,047 B1 * | 2/2001 | Haag et al. ....................... | 384/55 |
| 7,441,956 B2 | 10/2008 | Koeniger et al. | |
| 7,740,207 B2 * | 6/2010 | Ferraz ............................ | 384/49 |

FOREIGN PATENT DOCUMENTS

| | | |
|---|---|---|
| DE | 1 873 729 | 6/1963 |
| DE | 94 01 514 | 4/1994 |
| DE | 10 2005 054 516 | 3/2007 |
| EP | 1 650 854 | 4/2006 |

OTHER PUBLICATIONS

Fee Modules VKK , R310EN 2403, Sep. 2008.

* cited by examiner

*Primary Examiner* — Thomas R Hannon
(74) *Attorney, Agent, or Firm* — Michael J. Striker

(57) ABSTRACT

A linear motion device, has a housing, an arm which is movably guided on the housing along a longitudinal axis and provided with two rolling surfaces composed of hardened steel and extending in direction of the longitudinal axis, the arm has a front end extending out of the housing, a separate receiving peg is fastened to the front end of the arm, a separate flange is fixed in position on the receiving peg in various rotary positions relative to the longitudinal axis, the rolling surfaces extend to a front end face of the arm, the flange is located in a region of the rolling surfaces directly adjacent to the front end face of the arm, and a separate orienting unit engages in a form-fit manner in the flange and in the rolling surfaces.

10 Claims, 4 Drawing Sheets

LINEAR MOTION DEVICE COMPRISING ROTATABLY ADJUSTABLE FLANGE

CROSS-REFERENCE TO RELATED APPLICATION

The invention described and claimed hereinbelow is also described in German Patent Application DE 10 2009 021 017.2 filed on May 13, 2009. This German Patent Application, whose subject matter is incorporated here by reference, provides the basis for a claim of priority of invention under 35 U.S.C. 119(a)-(d).

BACKGROUND OF THE INVENTION

The present invention relates to a linear motion device.

EP 1 650 854 B1 makes known a linear motion device. According to FIGS. 1 and 2 of EP 1 650 854 B1, linear motion device 10 includes a housing 14 and an arm 12. Two U-shaped guide bodies 24; 25 that enclose the arm are provided in the housing. Four rolling element circuits are located in each of the guide bodies, rolling bodies 40 of which roll on rolling surfaces 64 of arms, which extend in the direction of longitudinal axis V, and therefore the arm is movably guided on the housing, in a direction of longitudinal axis V. The rolling surfaces of the arm are composed of hardened steel, and therefore the guide mechanism has a sufficiently long service life. The motion of the arm relative to the housing is driven via a ball screw drive 18; 20, spindle 20 of which is set into rotation by an electric motor 16. Arm 12 extends via a front end 12a out of housing 12, a separate flange 80 being fastened to front end 12a.

A related linear motion device is known from the catalog "Feed Moduls VKK" (No. R310EN 2403; version 2008.09) published by the applicant. This linear motion device differs from the linear motion device known from EP 1 650 854 B1, e.g., in terms of the fastening of the flange to the arm. According to page 41 of the aforementioned catalog, a separate, substantially cylindrical receiving peg is provided on the front end of the arm, and includes an external thread that is screwed into the front end of the arm. The separate flange includes a receiving bore that is fitted to the receiving peg. The flange is fastened to the receiving peg using two threaded pins which are screwed into the flange transversely to the longitudinal axis, and so their tip presses against the receiving peg. Using this type of fastening, the flange may be fastened to the arm in any rotary position.

The disadvantage of the flange fastening described above is that it is very difficult to fasten the flange in a defined rotary position relative to the arm. This problem is exacerbated by the fact that the threaded pins plastically deform the receiving peg when they are tightened using the amount of torque required to ensure sufficient clamping. This results in clamping marks being formed in the receiving peg. As a result, it is very difficult to correct small alignment errors once the flange has been tightly clamped to the receiving peg. This is due to the fact that the threaded pins always slide back into the existing clamping marks on the receiving peg if the new clamping position is not sufficiently far away from the clamping marks.

SUMMARY OF THE INVENTION

The object of the present invention is to provide a flange fastening means via which the flange may be fastened in a defined rotary position on the arm. The defined rotary position should be particularly accurately reproducible. At the same time, it should be possible to fasten the flange in different rotary positions on the arm any number of times.

According to the present invention, this object is attained by the fact that the rolling surfaces extend to a front end face of the arm, the flange being located, in the region of the rolling surfaces, directly adjacent to the front end face of the arm, and a separate orienting means is provided that engages, in a form-fit manner, in the flange and in the rolling surfaces. Accordingly, the rolling surfaces of the arm are used as a reference contour for the orientation of the flange. This reference contour has a very high level of accuracy since the rolling surfaces for a linear roller bearing must be manufactured with a very high level of accuracy anyway.

The flange is oriented to this reference contour using the orienting means. To attain exact orientation, the distance between the flange and the rolling surfaces must be particularly small. The flange is therefore located, in the region of the rolling surfaces, directly adjacent to the front end faces of the arm, the rolling surfaces likewise extending to the front end face of the arm, and therefore the distance between the rolling surfaces and the engagement contours for the orienting means on the flange is very small.

The rolling surfaces may have a substantially circular cross section, and the separate orienting means are cylindrical pins that extend in the direction of the longitudinal axis, and orienting recesses, which are fitted to the cylindrical pins, and into which the cylindrical pins engage, are provided on the flange. Cylindrical pins are available as cost favorable standard components having high diametral accuracy. Since their cylindrical shape bears closely against the rolling surfaces, which have a substantially circular cross section, an approximately play-free engagement may be attained between the cylindrical pins and the rolling surfaces, thereby resulting in high orienting accuracy between the flange and the arm. At the same time, the orienting recesses for the cylindrical pins may also be manufactured in a cost-favorable manner and with high accuracy. It is particularly preferable for the rolling surfaces to have a known, Gothic arch-type cross-sectional shape. It encloses the cylindrical pins via a particularly large circumferential region, thereby resulting in a particularly secure placement of the cylindrical pins against the rolling surface, thereby further increasing the orienting accuracy. It should be noted that the rolling surface is provided with a substantially circular cross section for spherical rolling elements.

A large number of orienting recesses, which are fitted to the orienting means, is located on the flange and is distributed around the longitudinal axis, thereby enabling the orienting recesses to be located adjacent to the rolling surfaces, depending on the rotary position of the flange, the orienting means engaging in the orienting recesses that are located adjacent to the rolling surfaces. Therefore, more orienting recesses than orienting means should be provided. As a result, the orienting means may engage in various orienting recesses, depending on the rotary position of the flange. The flange may therefore be fastened in many different rotary positions on the receiving peg. It is preferable for the orienting recesses to be distributed evenly around the flange. Furthermore, it is preferable for two rolling surfaces to be offset by 180° on the arm, in which case the number of evenly distributed orienting recesses is a multiple of two. In the case of the latter embodiment in particular, a particularly small number of orienting recesses and a particularly large number of different rotary positions on the flange result.

The receiving peg may include an external thread, via which it is fastened to the front end of the arm; a collar is situated adjacent to the external thread and bears against the front end face of the arm, and a receiving recess for the collar of the receiving peg is provided in the flange. A receiving peg that includes an external thread and a collar is already known from the aforementioned catalog published by the applicant. In terms of using a receiving peg of this type, the problem arises that the width of the collar must be bridged by the orienting means. Via the proposed receiving recess for the collar, the flange may nevertheless be located directly adjacent to the rolling surface, and therefore the orienting means need not bridge unnecessary distances that reduce the orienting accuracy. It should be noted here that the diameter of the collar is preferably selected to be so small that the collar does not cover the rolling surfaces on the end face.

The flange may include a receiving bore that is fitted to the receiving peg, and includes a clamping recess that cuts into the receiving bore; a clamping jaw that is movable relative to the flange is accommodated in the clamping recess, and includes a clamping surface that is fitted to the receiving peg. The clamping jaw therefore clamps the receiving peg via a very large clamping surface. The bearing pressure is therefore very low, thereby approximately ruling out a plastic deformation of the receiving peg. The clamp connection may be released and re-clamped as often as desired without this having a negative effect on the orienting accuracy of the flange.

It is preferable for the clamping surface to extend in the circumferential direction by between 90° and 180° around the receiving peg. A particularly low bearing pressure is attained as a result. It does not make sense to go beyond 180° since this would hinder the mobility of the clamping jaw.

At least one separate screw bolt may be provided, via which the clamping jaw may be pressed against the receiving peg. By using a screw bolt, a sufficiently great clamping force may be attained, and therefore a secure fastening of the flange to the receiving bolt is ensured. In particular, a clamp connection of this type is highly stressable by torques about the longitudinal axis. It is therefore ruled out that the orienting means could be sheared off via accidental rotation resulting from overload. Particularly preferably, a clamping jaw is used that is separate from the flange and is screwed to the flange on both sides of the receiving peg.

The receiving peg may include a projection that extends around the longitudinal axis, and/or a circumferential groove, to which the receiving bore and/or the clamping jaw are/is fitted. As a result, a form-fit engagement between the flange and the receiving peg is provided, thereby preventing the flange from being pulled away from the peg in the direction of the longitudinal axis even if it is fixedly clamped in position using a small amount of force. Via this measure, the operational reliability of the linear motion device is increased since the flange is prevented from falling abruptly if the clamp slowly comes loose. At the same time, installation is simplified since the form-fit connection ensures that a defined longitudinal position of the flange on the receiving peg is attained. It should also be pointed out that the circumferential design of the projection and the recess ensures that the flange is rotatable relative to the arm provided that a small clamping force is applied, and provided that the orienting means have not yet been installed.

The end region of the flange, in which the orienting recesses are located, may enclose the receiving peg in an annular manner, and the clamping recess is located adjacent to the aforementioned end region of the flange. The amount of space that is available in the aforementioned end region is therefore sufficient to accommodate a large number of orienting recesses. The flange may therefore be fastened in a very large number of different rotary positions on the arm The arm may include a body made of aluminum, in which case the rolling surfaces are provided on separate rolling surface parts that are pressed together with the body. In association with an arm of this type, the flange fastening means according to the present invention is particularly advantageous since the forces applied by the orienting means to the rolling surfaces are very low. It is therefore ruled out that the position of the rolling surface parts on the front end of the arm will change due to a plastic deformation of the body. It should be noted that the body must have a certain plastic deformability, so that the rolling surface parts could be pressed in. However, this plastic deformability may result in unintentional deformations taking place in the end region of the rolling surface parts themselves if large punctiform forces act there on the rolling surface part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
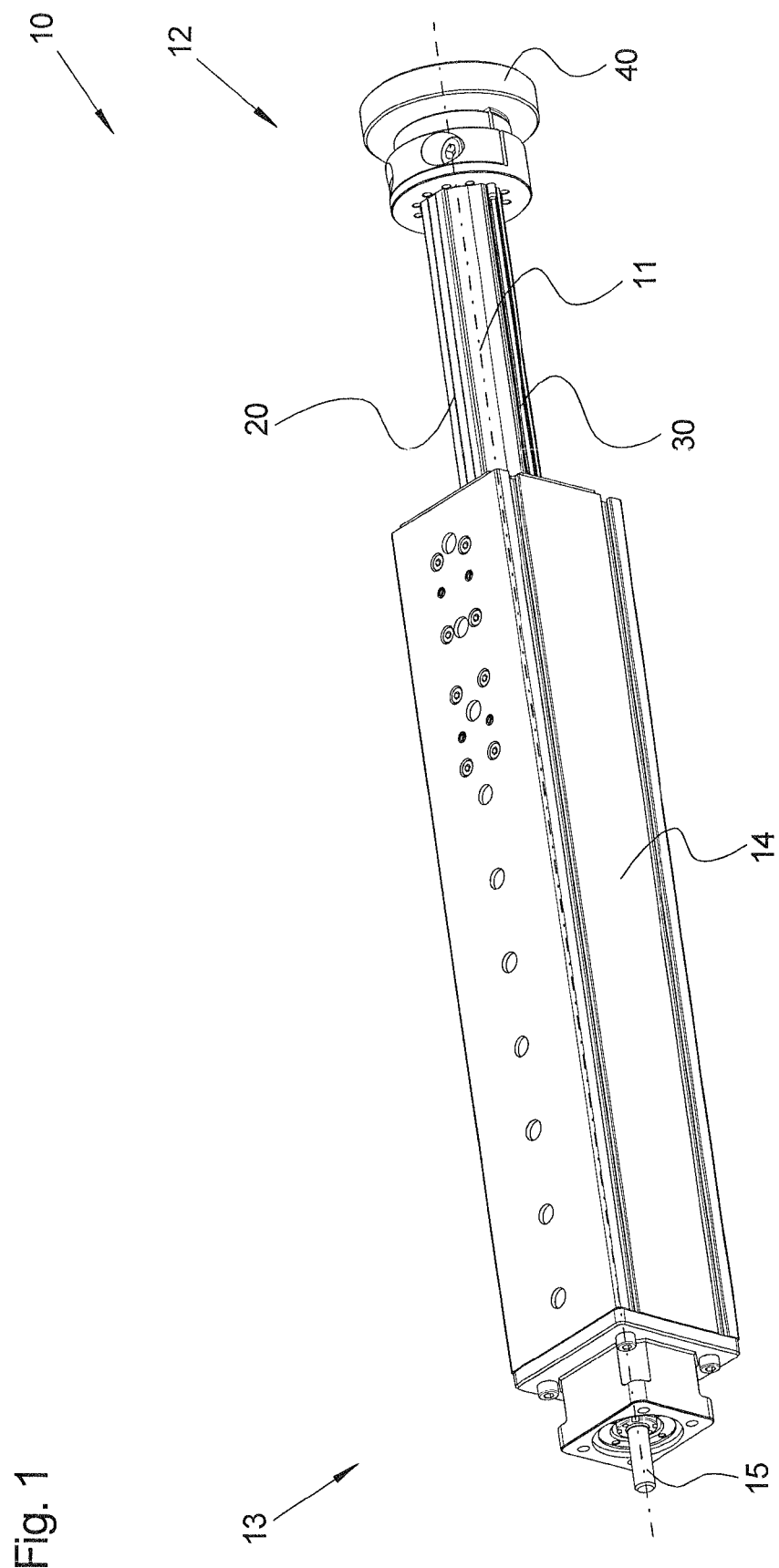
FIG. 1 shows a perspective view of a linear motion device according to the present invention.

FIG. 1 shows a linear motion device 10, according to the present invention, that has a longitudinal axis 11. Linear motion device 11 includes a housing 14 and an arm 20 that is movable relative to housing 14 in the direction of longitudinal axis 11. Arm 20 is guided in housing 14 via a circulating ball mechanism (not depicted) according to EP 1 650 854 B1. EP 1 650 854 B1 is therefore referenced here and is incorporated in the contents of the present application. The balls of the circulating ball mechanism roll on two rolling surfaces 30 which are installed on arm 20 such that they are offset by 180° relative to longitudinal axis 11, and they extend substantially along the entire length of arm 20.

Arm 20 extends, at front end 12 of linear motion device 10, out of housing 14, thereby enabling it to extend and retract in the manner of a piston rod. A flange 40 is provided on front end 12 of arm 20, to which a higher-order assembly (not depicted) may be fastened, and using which linear motion device 10 may be set into motion.

A drive peg 15 that is used to connect an electric motor (not depicted) is provided at rear end 13 of linear motion device 11. Drive peg 15 is designed as a single piece with a ball screw spindle (not depicted) which is rotatably accommodated inside housing 14. The ball screw spindle is engaged in a threaded manner with a recirculating ball nut (not depicted)

that is connected to arm 20, thereby enabling arm 20 to extend and retract with the aid of the electric motor.

Figure 2:
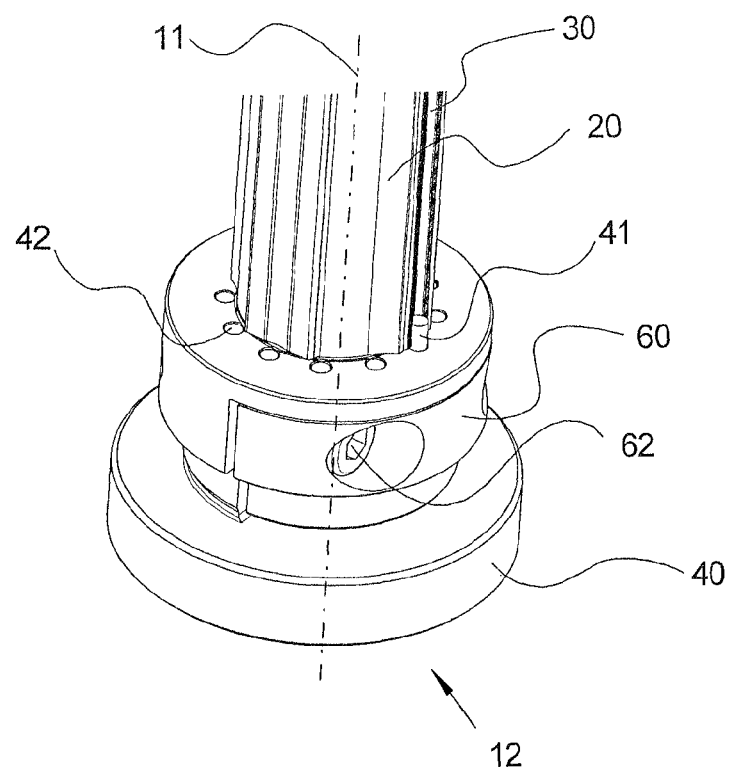
FIG. 2 shows a partial view of the linear motion device shown in FIG. 1, in the region of the flange.
Figure 2A:
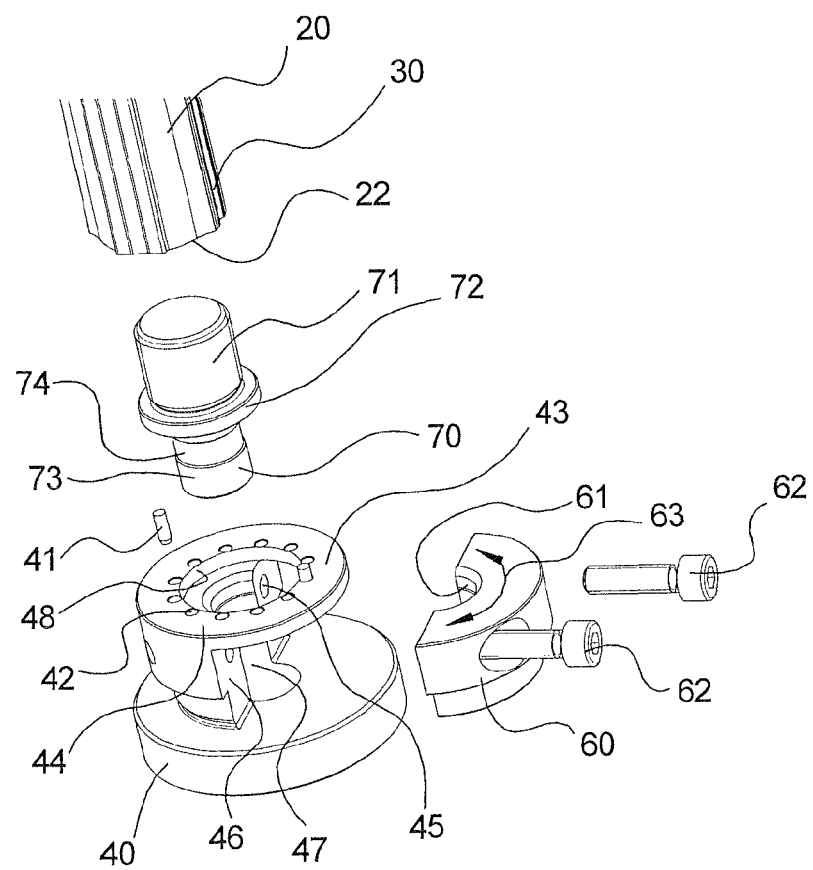
FIG. 2a shows an exploded view of the section shown in FIG. 2.

FIG. 2 shows a partial view of the linear motion device in the region of flange 40, and FIG. 2a shows the same section, in an exploded view.

Arm 20 is designed substantially as a profiled element that extends in the direction of longitudinal axis 11 and terminates in a flat, front end face 22. A receiving peg 70 is fastened to front end 12 of arm 20. For this purpose, receiving peg 70 includes an external thread 71 that is screwed into a matching internal thread (FIG. 3; number 23) on arm 20. A collar 72 abuts external thread 71 and comes to bear against front end face 22 of arm 20. A cylindrical peg 73, which receives flange 40, is located on the front end of receiving peg 70.

Flange 40 is provided with a substantially cylindrical receiving bore 47 that is fitted to cylindrical peg 73, thereby enabling peg 73 to be moved into various rotary positions on flange 40. A clamping recess 46 is located in flange 40 in such a manner that it cuts into receiving bore 47. Clamping jaw 60, which is accommodated in clamping recess 46, may therefore be pressed via clamping surface 61 against cylindrical peg 73 when flange 40 is located on receiving peg 70. Clamping surface 61 is likewise fitted to cylindrical peg 73, thereby resulting in a substantially even bearing pressure across entire clamping surface 61. Clamping surface 61 extends around cylindrical peg 73 in circumferential direction 63 by approximately 180°. The clamping force is created using two screw bolts 62 which are located on either side of clamping surface 61, in parallel and at a distance from one another. Screw bolts 62 extend through a clamping jaw 60 and engage in an assigned internal thread 45 on flange 40.

Rear end region 43 of flange 40, which faces arm 20, encloses receiving peg 70 in an annular manner, and a total of twelve orienting recesses 42 are evenly distributed around longitudinal axis 11 in aforementioned end region 43. Orienting recesses 42 are designed in the form of cylindrical bores that extend in the direction of longitudinal axis 11 and are fitted to orienting means 41 which are designed in the form of two cylindrical pins. Furthermore, a receiving recess 48 for collar 72 of receiving peg 70 is provided in rear end region 43 of flange 40, and therefore rear end face 44 of flange 40 is located directly adjacent to front end face 22 of arm 20. Orienting means 41 in the form of cylindrical pins may therefore engage simultaneously in one of the orienting recesses 42 and in an assigned rolling surface 30, thereby securing flange 40 in a form-fit manner against rotation relative to arm 20.

Figure 3:
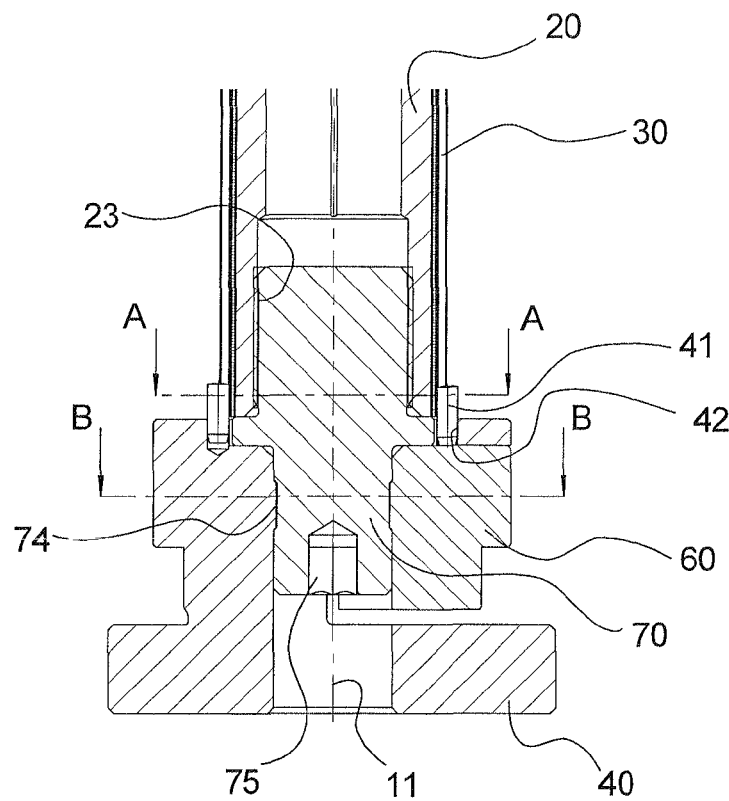
FIG. 3 shows a longitudinal view of the arm in the region of the flange.

FIG. 3 shows a longitudinal sectional view of arm 20 in the region of flange 40. In particular, FIG. 3 shows how cylindrical pins 41 engage in orienting recesses 42 and assigned rolling surface 30. Cylindrical pins 41 are accommodated via a press fit in assigned orienting recesses 42, and are therefore held there in a substantially rigid manner.

A circumferential groove 74 is provided on cylindrical peg 72 (see also FIG. 2a), into which flange 40 and clamping jaw 60 engage in a form-fit manner. It is therefore ensured that flange 40 is installed, in the direction of longitudinal axis 11, in a defined position on receiving peg 70. In particular, it is ensured that the distance between orienting recesses 42 and rolling surfaces 30 is small, thereby making it possible to use very short cylindrical pins 41.

Receiving peg 70 is screwed into internal thread 23 on arm 20 using hexagonal socket 75 on front end of receiving peg 70.

Figure 4:
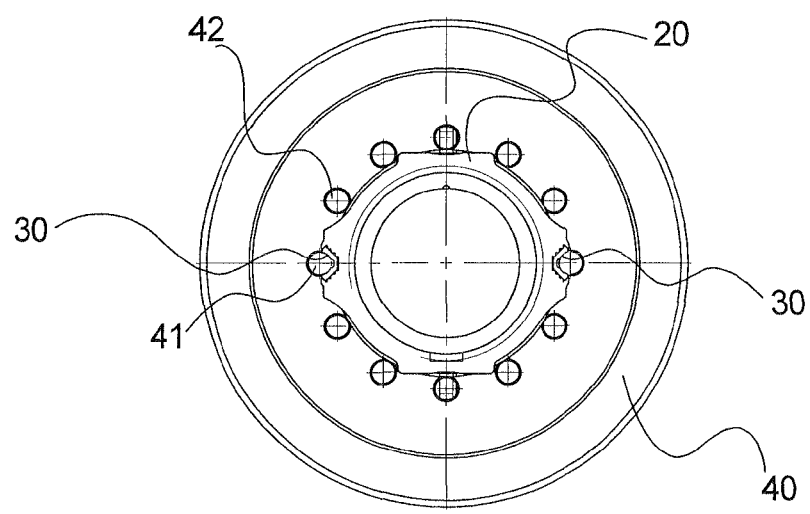
FIG. 4 shows a cross section of the arm along the line of intersection A-A in FIG. 3.

FIG. 4 shows a cross section of arm 20 along line of intersection A-A in FIG. 3. Reference is made to the colinear orientation of rolling surfaces 30 with orienting recesses 42. FIG. 4 also shows that rolling surfaces 30 are offset by 180° relative to one another.

Figure 5:
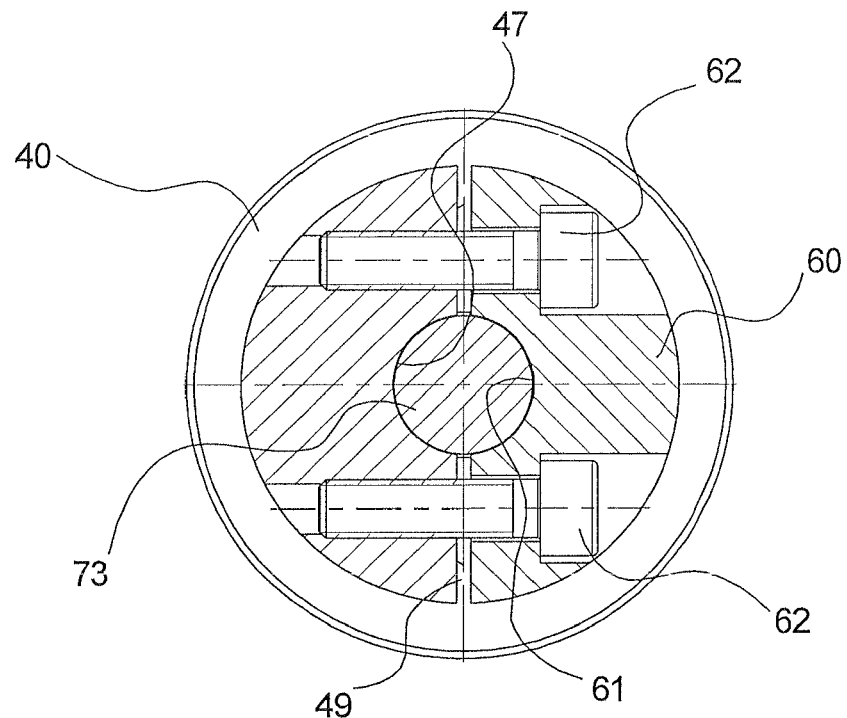
FIG. 5 shows a cross section of the flange along the line of intersection B-B in FIG. 3.

FIG. 5 shows a cross section of flange 40 along line of intersection B-B in FIG. 3. The cutting plane extends through the central axis of screw bolt 62. FIG. 5 shows clamping surface 61, which is fitted to cylindrical pin 73, of clamping jaw 60, and substantially cylindrical receiving bore 47 of flange 40. Clamping jaw 60 is situated at a distance from flange 40, thereby enabling the entire clamping force of screw bolts 62 to act upon clamping surface 61.

Figure 6:
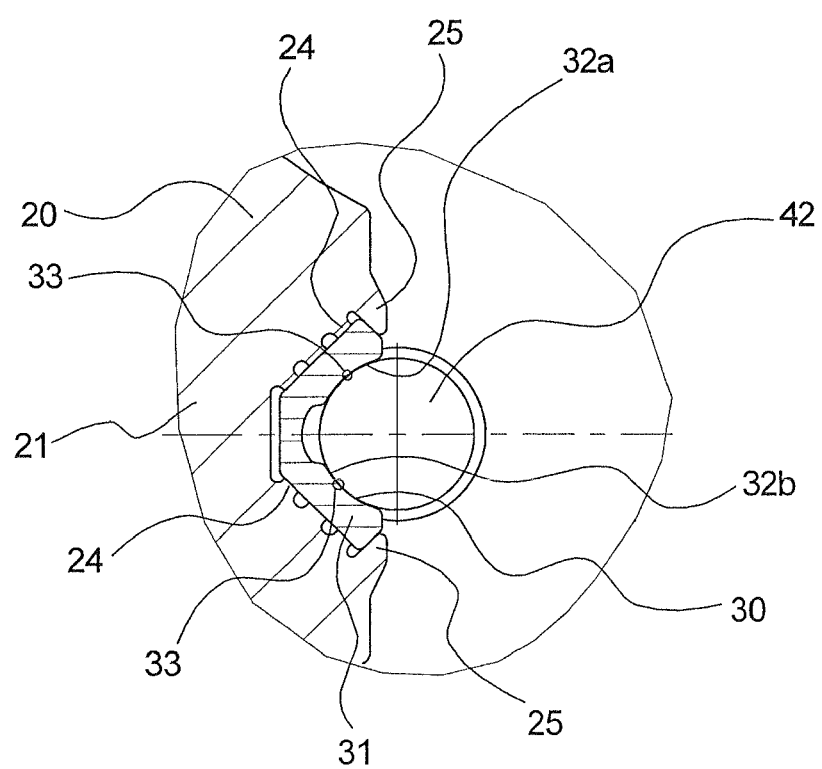
FIG. 6 shows an enlarged partial cross-sectional view of the arm in the region of a rolling surface.

FIG. 6 shows an enlarged partial cross section of arm 20 in the region of rolling surface 30. Rolling surface 30 is provided on a separate rolling surface part 31 which is made of hardened roller bearing steel. Two partial rolling surfaces 32a; 32b are provided on rolling surface part 31, which has a V-shape overall, the radius of curvature of which is minimally greater than the radius of the balls in the aforementioned circulating ball mechanism. Pressure point 33 of the balls is located, in each case, in the center of assigned partial rolling surfaces 32a; 32b, and therefore partial rolling surfaces 32a; 32b together have a cross-sectional profile having the shape of a Gothic arch.

Body 21 of arm 20 is extruded out of aluminum. Rolling surface part 31 lies, via a total of six segments 24 that extend in the direction of the longitudinal axis, on body 21. Segments 24 are plastically deformed when rolling surface part 31 is pressed into body 21, until rolling surface part 31 is located in the desired position, and therefore rolling surfaces 30 have the desired positional accuracy. Rolling surface part 31 is held in the installation position via holding projections 25 of body 21; holding projections 25 are likewise plastically deformed when rolling surface part 31 is pressed into place. A rolling surface part 31 of this type is known from DE 10 2004 018820 A1, which is hereby referenced and incorporated as subject matter of the present application.

It will be understood that each of the elements described above, or two or more together, may also find a useful application in other types of constructions and methods differing from the types described above.

While the invention has been illustrated and described as embodied in a linear motion device comprising rotatably adjustable flange, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A linear motion device, comprising a housing; an arm which is movably guided on said housing along a longitudinal axis, said arm being provided with two rolling surfaces composed of hardened steel and extending in direction of said longitudinal axis, said arm having a front end extending out of said housing; a separate receiving peg fastened to said front end of said arm; a separate flange fixed in position on said receiving peg in various rotary positions relative to said longitudinal axis, wherein said rolling surfaces extend to a front end face of said arm, and said flange is located in a region of said rolling surfaces directly adjacent to said front end face of said arm; and a separate orienting means engaged in a form-fit manner in said flange and in said rolling surfaces.

2. The linear motion device as defined in claim 1, wherein said rolling surfaces have a substantially circular cross section, wherein said separate orienting means are cylindrical pins that extend in direction of said longitudinal axis; further comprising orienting recesses which are fitted to said cylindrical pins and into which said cylindrical pins engage.

3. The linear motion device as defined in claim 2, wherein said orienting recesses which are fitted to said orienting means are located on said flange and distributed around said longitudinal axis, thereby enabling said orienting recesses to be located adjacent to said rolling surfaces, depending on a rotary position of said flange, wherein said orienting means engaging in said orienting recesses that are located adjacent to said rolling surfaces.

4. The linear motion device as defined in claim 1, wherein said receiving peg includes an external thread, via which said receiving peg is fastened to said front end of said arm, and further comprising a collar situated adjacent to said external thread and bearing against said front end face of said arm; and a receiving recess for said collar of said receiving peg provided in said flange.

5. The linear motion device as defined in claim 4, wherein said flange includes a receiving bore that is fitted to said receiving peg, and a clamping recess that cuts into said receiving bore; further comprising a clamping jaw that is movable relative to said flange, accommodated in said clamping recess, and including a clamping surface that is fitted to said receiving peg.

6. The linear motion device as defined in claim 5, wherein said clamping surface extends around said receiving peg in a circumferential direction by between 90° and 180°.

7. The linear motion device as defined in claim 5, further comprising at least one separate screw bolt, via which said clamping jaw is pressed against said receiving peg.

8. The linear motion device as defined in claim 5, wherein said receiving peg includes an element selected from the group consisting of a projection, a circumferential groove, and both that extends about said longitudinal axis, and to which an element selected from the group consisting of said receiving bore, said clamping jaw, and both is fitted.

9. The linear motion device as defined in claim 5, wherein said flange has an end region in which said orienting recesses are located, and which encloses said receiving peg in an annular manner, wherein said clamping recess is located adjacent to said end region of said flange.

10. The linear motion device as defined in claim 1, wherein said arm includes a body composed of aluminum, said rolling surfaces being provided on separate rolling surface parts that are pressed together with said body.

\* \* \* \* \*